(12) United States Patent
Araki

(10) Patent No.: US 9,085,297 B2
(45) Date of Patent: Jul. 21, 2015

(54) OUTPUT RESTRICTION CONTROL DEVICE, HYBRID VEHICLE, OUTPUT RESTRICTION CONTROL METHOD, AND COMPUTER PROGRAM

(75) Inventor: Tomohiko Araki, Tokyo (JP)

(73) Assignee: HINO MOTORS, LTD., Tokyo (JP)

( * ) Notice: Subject to any disclaimer, the term of this patent is extended or adjusted under 35 U.S.C. 154(b) by 166 days.

(21) Appl. No.: 13/819,096

(22) PCT Filed: Oct. 20, 2011

(86) PCT No.: PCT/JP2011/074201
§ 371 (c)(1),
(2), (4) Date: Feb. 26, 2013

(87) PCT Pub. No.: WO2012/053611
PCT Pub. Date: Apr. 26, 2012

(65) Prior Publication Data
US 2013/0158767 A1    Jun. 20, 2013

(30) Foreign Application Priority Data
Oct. 21, 2010   (JP) ................... 2010-236613

(51) Int. Cl.
*B60W 20/00*   (2006.01)
*B60W 30/182*  (2012.01)
(Continued)

(52) U.S. Cl.
CPC ............... *B60W 20/108* (2013.01); *B60K 6/48* (2013.01); *B60L 11/14* (2013.01); *B60L 15/20* (2013.01); *B60W 10/06* (2013.01); *B60W 10/08* (2013.01); *B60W 20/00* (2013.01); *B60W 30/182* (2013.01); *B60W 30/18163* (2013.01); *B60W 50/087* (2013.01); *B60L 2210/30* (2013.01); *B60L 2210/40* (2013.01); *B60L 2240/421* (2013.01); *B60L 2240/423* (2013.01); *B60L 2240/443* (2013.01); *B60L 2250/16* (2013.01);
(Continued)

(58) Field of Classification Search
CPC ...................... B60W 30/18163; B60W 30/182
See application file for complete search history.

(56) References Cited

U.S. PATENT DOCUMENTS 3,863,205 A * 1/1975 Chun-Chih ................... 340/438
5,774,820 A * 6/1998 Linden et al. .................. 701/93
(Continued)

FOREIGN PATENT DOCUMENTS

CN     1818430 A     8/2006
CN     101115638 A   1/2008
(Continued)

OTHER PUBLICATIONS

The above references were cited in the International Search Report of the corresponding International Application, PCT/JP2011/074201 dated Nov. 15, 2011.
(Continued)

*Primary Examiner* — John Q Nguyen
*Assistant Examiner* — Michael Whalen
(74) *Attorney, Agent, or Firm* — Cowan, Liebowitz & Latman, P.C.; Mark Montague

(57) ABSTRACT

To improve the drivability of a driver while performing an output restriction. A hybrid vehicle has an output restriction control unit that releases or restores an output restriction in accordance with a predetermined operation by the driver, and a predetermined release rate or a predetermined restoration rate can be set for the release or the restoration of the output restriction.

7 Claims, 7 Drawing Sheets

(51) Int. Cl.
  B60K 6/48      (2007.10)
  B60L 11/14     (2006.01)
  B60W 10/06     (2006.01)
  B60W 10/08     (2006.01)
  B60W 30/18     (2012.01)
  B60L 15/20     (2006.01)
  B60W 50/08     (2012.01)

(52) U.S. Cl.
  CPC ...... *B60W2540/103* (2013.01); *B60W 2540/20* (2013.01); *B60W 2600/00* (2013.01); *B60W 2710/0672* (2013.01); *B60W 2710/085* (2013.01); *B60W 2710/1022* (2013.01); *B60W 2710/1027* (2013.01); *Y02T 10/6221* (2013.01); *Y02T 10/6286* (2013.01); *Y02T 10/642* (2013.01); *Y02T 10/70* (2013.01); *Y02T 10/7077* (2013.01); *Y02T 10/7241* (2013.01); *Y02T 10/7275* (2013.01); *Y10S 903/93* (2013.01)

(56) References Cited

U.S. PATENT DOCUMENTS

| | | | |
|---|---|---|---|
| 5,864,771 A * | 1/1999 | Yokoyama et al. | 701/51 |
| 6,347,272 B2 * | 2/2002 | Flammersfeld et al. | 701/93 |
| 6,671,608 B2 * | 12/2003 | McKenzie et al. | 701/93 |
| 8,112,214 B2 * | 2/2012 | Lehner et al. | 701/93 |
| 8,285,470 B2 * | 10/2012 | Wang et al. | 701/103 |
| 2001/0044690 A1 * | 11/2001 | Flammersfeld et al. | 701/93 |
| 2002/0111735 A1 * | 8/2002 | McKenzie et al. | 701/114 |
| 2006/0142115 A1 | 6/2006 | Senda et al. | |
| 2007/0255477 A1 | 11/2007 | Okuda et al. | |
| 2012/0046812 A1 * | 2/2012 | Sujan et al. | 701/22 |
| 2013/0158770 A1 * | 6/2013 | Araki | 701/22 |
| 2014/0277987 A1 * | 9/2014 | Rogalski et al. | 701/93 |

FOREIGN PATENT DOCUMENTS

| | | |
|---|---|---|
| DE | 102004024374 A1 | 12/2005 |
| DE | 102009008872 A1 | 8/2010 |
| EP | 2028353 A2 | 2/2009 |
| JP | 2003-113724 A | 4/2003 |
| JP | 2008-155876 A | 7/2008 |

OTHER PUBLICATIONS

Some of the above references were cited in an Office Action of the corresponding CN 201180040639.7 application; dated Feb. 2, 2015.
Some of the above references were cited in an Extended EPO search report of corresponding EP 11834450.6; dated Feb. 24, 2015.

* cited by examiner

OUTPUT RESTRICTION CONTROL DEVICE, HYBRID VEHICLE, OUTPUT RESTRICTION CONTROL METHOD, AND COMPUTER PROGRAM

CROSS REFERENCE TO RELATED APPLICATIONS

This is a U.S. national stage of application No. PCT/JP2011/074201, filed on Oct. 20, 2011. Priority under 35 U.S.C. §119(a) and 35 U.S.C. §365(b) is claimed from Japanese Patent Application No. 2010-236613, filed on Oct. 21, 2010, the disclosure of which are also incorporated herein by reference.

TECHNICAL FIELD

The present invention relates to an output restriction control device, a hybrid vehicle, an output restriction control method, and a computer program.

BACKGROUND ART

As one of measures for reducing exhaust gas of a vehicle, there is an output restriction method of restricting torque of an engine with respect to a driver's request torque. According to this method, even though a driver steps an accelerator pedal maximally, a predetermined restriction is given to the torque of the engine, and as a result, it is controlled to produce only an output less than the maximum torque (see, for example, patent literature PTL1).

CITATION LIST

Patent Literature

PTL1: JP 2006-280049 A

SUMMARY OF INVENTION

Technical Problem

According to the aforementioned output restriction method, the driver's request torque is restricted, but in a case in which an own vehicle overtakes the other vehicle, and the like, it is preferable to satisfy the driver's torque request. Therefore, in the conventional art, when a driver suddenly operates an accelerator over a predetermined accelerator opening level, an output restriction is temporarily cancelled. In this case, when a driving state is restored from the sudden operation of the accelerator, the output restriction is again started, and as a result, the driver feels a driving sense as if a quick brake is put on. This is not preferable in terms of drivability.

The present invention has been made under the aforementioned circumstances and an object of the present invention is to provide an output restriction control device, a hybrid vehicle, an output restriction control method, and a computer program that can improve a driver's drivability while performing an output restriction.

Solution to Problem

An aspect of the present invention is directed to an output restriction control device. The output restriction control device is mounted on a hybrid vehicle having an engine and an electric motor, which is drivable by the engine or the electric motor or drivable by cooperation of the engine and the electric motor includes an output restriction means that restricts torque output from the engine and/or the electric motor, wherein the output restriction means releases or restores an output restriction in accordance with a predetermined operation of a driver, and a predetermined release rate or a predetermined restoration rate is settable for release or restoration of the output restriction, respectively.

The predetermined operation is, for example, an operation of an accelerator and an operation of a direction indicator. And the output restriction means may, with respect to a driver's sudden operation of an accelerator over a predetermined accelerator opening level, immediately release the output restriction and gently restore the output restriction based on a predetermined restoration rate in restoration from the unexpected accelerator operation, and with respect to a driver's operation of a direction indicator, gently release the output restriction based on a predetermined release rate and gently restore the output restriction based on a predetermined restoration rate when the operation of the direction indicator is terminated.

When at least some of a series of controls to restore from release of the output restriction caused by the operation of the accelerator and a series of controls to restore from release of the output restriction caused by the operation of the direction indicator are performed in parallel, a side in which a torque value of a control result is larger may be adopted.

Alternatively, when any one control of a series of controls to restore from release of the output restriction caused by the operation of the accelerator and a series of controls to restore from release of the output restriction caused by the operation of the direction indicator is performed, the other control may not be performed.

The output restriction control device may further include an output restriction release display unit displaying that the output restriction means releases the output restriction.

Another aspect of the present invention is directed to a hybrid vehicle. The hybrid vehicle according to the other aspect of the present invention has the output restriction control device according to the present invention.

Still another aspect of the present invention is directed to an output restriction control method. The output restriction control method is for an output restriction control device which is mounted on a hybrid vehicle having an engine and an electric motor, which is drivable by the engine or the electric motor or drivable by cooperation of the engine and the electric motor and the output restriction control device has an output restriction means for restricting torque output from the engine and/or the electric motor. The output restriction control method includes an output restriction control step of releasing or restoring an output restriction in accordance with a predetermined operation of a driver, in which a predetermined release rate or a predetermined restoration rate is settable for release or restoration of the output restriction, respectively.

Still another aspect of the present invention is directed to a computer program. The computer program causes an information processing device to execute a function of the output restriction control device according to the present invention.

Advantageous Effects of Invention

According to the present invention, a driver's drivability can be improved while performing an output restriction.

DESCRIPTION OF EMBODIMENTS

Hereinafter, a hybrid vehicle according to embodiments of the present invention will be described with reference to FIGS. 1 to 7.

Figure 1:
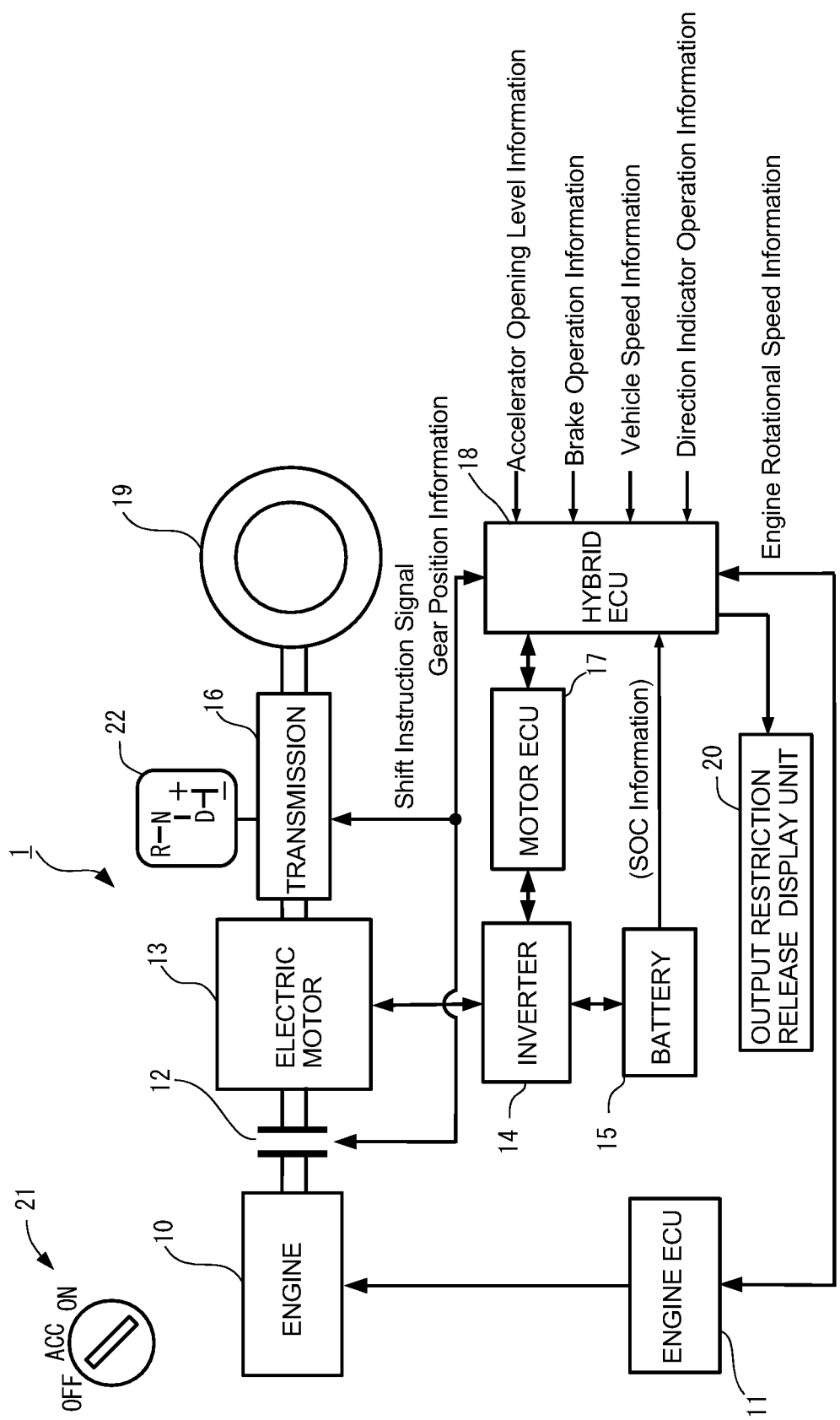
FIG. 1 is a block diagram illustrating a configuration example of a hybrid vehicle according to an embodiment of the present invention.

FIG. 1 is a block diagram illustrating a structure example of a hybrid vehicle 1. The hybrid vehicle 1 is one example of a vehicle. The hybrid vehicle 1 is driven by an engine (internal combustion engine) 10 and/or an electric motor 13 through a gear shift of a semi-automatic transmission and can perform an output restriction to restrict torque output from the engine 10 and/or the electric motor 13. Note that the semi-automatic transmission refers to a transmission that can automatically perform a shifting operation with the same configuration as that of a manual transmission.

The hybrid vehicle 1 includes an engine 10, an engine ECU (electronic control unit) 11, a clutch 12, an electric motor 13, an inverter 14, a battery 15, a transmission 16, a motor ECU 17, a hybrid ECU 18, a vehicle wheel 19, an output restriction release display unit 20, a key switch 21, and a shift unit 22. Note that the transmission 16 has the aforementioned semi-automatic transmission and is operated by the shift unit 22 having a drive range (hereinafter, referred to as a D (drive) range).

The engine 10 as one example of the internal combustion engine is controlled by the engine ECU 11 to generate motive power to rotate a shaft by combusting gasoline, gas oil, CNG (compressed natural gas), LPG (liquefied petroleum gas), or alternative fuel therein and to transfer the generated motive power to the clutch 12.

The engine ECU 11 is a computer which operates in conjunction with the motor ECU 17 by following an instruction from the hybrid ECU 18 and controls the engine 10 such as a fuel injection amount or a valve timing. For example, the engine ECU 11 includes a CPU (central processing unit), an ASIC (application specific integrated circuit), a microprocessor (microcomputer), a DSP (digital signal processor), and the like, and has a computing unit, a memory, and an I/O (input/output) port, and the like therein.

The clutch 12 is controlled by the hybrid ECU 18 to transfer a shaft output from the engine 10 to the vehicle wheel 19 through the electric motor 13 and the transmission 16. That is, the clutch 12 mechanically connects a rotational shaft of the engine 10 and a rotational shaft of the electric motor 13 to each other to transfer the shaft output of the engine 10 to the electric motor 13 or breaks the mechanical connection of the rotational shaft of the engine 10 and the rotational shaft of the electric motor 13 to allow the shaft of the engine 10 and the rotational shaft of the electric motor 13 to rotate at different rotational velocities, by the control of the hybrid ECU 18.

For example, the clutch 12 mechanically connects the rotational shaft of the engine 10 and the rotational shaft of the electric motor 13 to each other when the hybrid vehicle 1 is driven by the motive power of the engine 10, and as a result, power is generated in the electric motor 13, when the engine 10 is assisted by driving force of the electric motor 13, and when the engine 10 is started by the electric motor 13.

Further, for example, the clutch 12 breaks the mechanical connection between the rotating shaft of the engine 10 and the rotating shaft of the electric motor 13 when the engine 10 is in a stopping state or an idling state and the hybrid vehicle 1 runs by the driving force of the electric motor 13, and when the engine 10 is in a stopping state or an idling state and the electric motor 13 generates electric power (regenerates electric power) while the hybrid vehicle 1 reduces the speed or runs on the down grade.

Note that the clutch 12 differs from a clutch operated by the driver's operation of a clutch pedal, and is operated by the control of the hybrid ECU 18.

The electric motor 13, which is a so-called a motor generator, generates the motive power to rotate the shaft by electric power supplied from the inverter 14 to supply the shaft output to the transmission 16 or is power-generated by the motive power to rotate the shaft, which is supplied from the transmission 16, and supplies the electric power to the inverter 14. For example, when the hybrid vehicle 1 gains the speed or runs at a constant speed, the electric motor 13 generates the power for rotating the shaft to supply the shaft output to the transmission 16 in order to cause the hybrid vehicle 1 to run in cooperation with the engine 10. Further, the electric motor 13 works as an electric generator, for example, when the electric motor 13 is driven by the engine 10, or the hybrid vehicle 1 runs with no power, such as the hybrid vehicle 1 is decelerated or is driven on the downhill grade. In that case, electric power is generated by the power for rotating the shaft supplied from the transmission 16 and is supplied to the inverter 14 in order to charge the battery 15.

The inverter 14 is controlled by the motor ECU 17, and converts DC voltage from the battery 15 into AC voltage or converts AC voltage from the electric motor 13 into DC voltage. When the electric motor 13 generates motive power, the inverter 14 converts the DC voltage of the battery 15 into the AC voltage to supply electric power to the electric motor 13. When the electric motor 13 generates power, the inverter 14 converts the AC voltage from the electric motor 13 into the DC voltage. That is, in this case, the inverter 14 serves as a rectifier for supplying the DC voltage to the battery 15 and a voltage adjusting device.

The battery 15, which is a chargeable and dischargeable secondary battery, supplies the electric power to the electric motor 13 through the inverter 14 when the electric motor 13 generates the motive power or is charged by the electric power generated by the electric motor 13 when the electric motor 13 generates electric power.

The transmission 16 has a semi-automatic transmission (not illustrated in the drawings) that selects any one of a plurality of gear ratios (shift ratios) according to a shift instruction signal from the hybrid ECU 18, and transfers the motive power of the shifted engine 10 and/or the motive power of the electric motor 13 to the vehicle wheel 19 by switching the shift ratio. Further, when the hybrid vehicle is decelerated or runs on the downhill grade, the transmission 16 transfers motive power from the vehicle wheel 19 to the electric motor 13. Note that in the semi-automatic transmission, a driver can manually change a gear position to a predetermined gear stage by operating the shift unit 22.

The motor ECU 17 is a computer that operates in conjunction with the engine ECU 11 by following an instruction from the hybrid ECU 18 and controls the electric motor 13 by controlling the inverter 14. For example, the motor ECU 17 includes a CPU, an ASIC, a microprocessor (microcomputer), a DSP, and the like and has a computing unit, a memory, an I/O port, and the like therein.

The hybrid ECU 18 is one example of a computer, and acquires opening level information of an accelerator, brake operating information, vehicle speed information, direction indicator operating information, gear position information acquired from the transmission 16, and engine rotation speed information acquired from the engine ECU 11 to control the clutch 12 by referring to the information and controls the transmission 16 by supplying a shift instruction signal, for hybrid driving. The hybrid ECU 18 gives a control command of the electric motor 13 and the inverter 14 to the motor ECU 17 based on acquired SOC information of the battery 15 and other information, and gives a control command of the engine 10 to the engine ECU 11, for hybrid driving. The hybrid ECU 18 controls a display of the output restriction release display unit 20 for displaying to the outside that the hybrid ECU 18 releases an output restriction described below. For example, the hybrid ECU 18 includes a CPU, an ASIC, a microprocessor (microcomputer), a DSP, and the like and has a computing unit, a memory, an I/O port, and the like therein.

Note that a computer program executed by the hybrid ECU 18 is prestored in a nonvolatile memory in the hybrid ECU 18 to be installed in the hybrid ECU 18 as the computer in advance.

The engine ECU 11, the motor ECU 17, and the hybrid ECU 18 are connected to each other by a bus based on a standard such as a CAN (control area network), and the like.

The vehicle wheel 19 is a driving wheel that transfers driving force to the road surface. Note that in FIG. 1, only one vehicle wheel 19 is illustrated, but the hybrid vehicle 1 actually has a plurality of vehicle wheels 19.

The output restriction release display unit 20 is for displaying to the outside that the output restriction to be described below is released. For example, the output restriction release display unit 20 is a pilot lamp of a red color, and the like, which blinks on or off when the output restriction is released. Alternatively, the output restriction release display unit 20 is a display that displays image information or text information, and when the output restriction is released, the output restriction release display unit 20 displays a gist thereof by figures, symbols, or animations, or characters. Alternatively, the output restriction release display unit 20 is a speaker that outputs voice information and when the output restriction is released, the output restriction release display unit 20 notifies a gist thereof through the voice information or a warning sound. Alternatively, the output restriction release display unit 20 may combine all or some of various information to display or output the combined information.

The key switch 21 is, for example, a switch that is turned on/off as the key is put by a user at the time of starting driving, and as the key switch 21 is turned on, each part of the hybrid vehicle 1 is started and as the key switch 21 is turned off, each part of the hybrid vehicle 1 is stopped.

Figure 2:
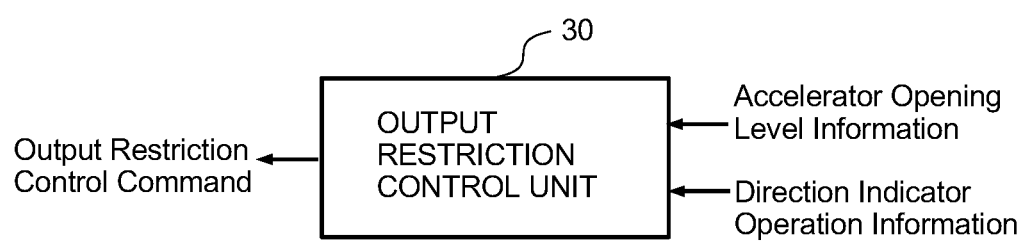
FIG. 2 is a block diagram illustrating a structure example of a function implemented in a hybrid ECU of FIG. 1.

FIG. 2 is a block diagram illustrating a configuration example of a function implemented in the hybrid ECU 18 that executes the computer program. That is, when the hybrid ECU 18 executes the computer program, an output restriction control unit 30 is implemented.

The output restriction control unit 30 performs a control to set an acceleration permitted for each gear stage. In detail, the output restriction control unit 30 performs a control to set torque lower than the driver's request torque for actual torque to each gear stage. The output restriction control unit 30 temporarily releases the output restriction based on accelerator opening level information or direction indicator operating information even during the output restriction.

Next, the relationship between a restriction acceleration and the gear stage, and a change in torque of the engine 10 during transmission in an output restriction control of the output restriction control unit 30 will be described with reference to FIG. 3. In an upper part of FIG. 3, the restriction acceleration in which the gear stage is at second, third, and fourth speeds is represented by a dotted line and an acceleration of the hybrid vehicle 1 is represented by a solid line. In a lower part of FIG. 3, the change in torque of the engine 10 of the hybrid vehicle 1 is illustrated to correspond to the upper figure.

Figure 3:
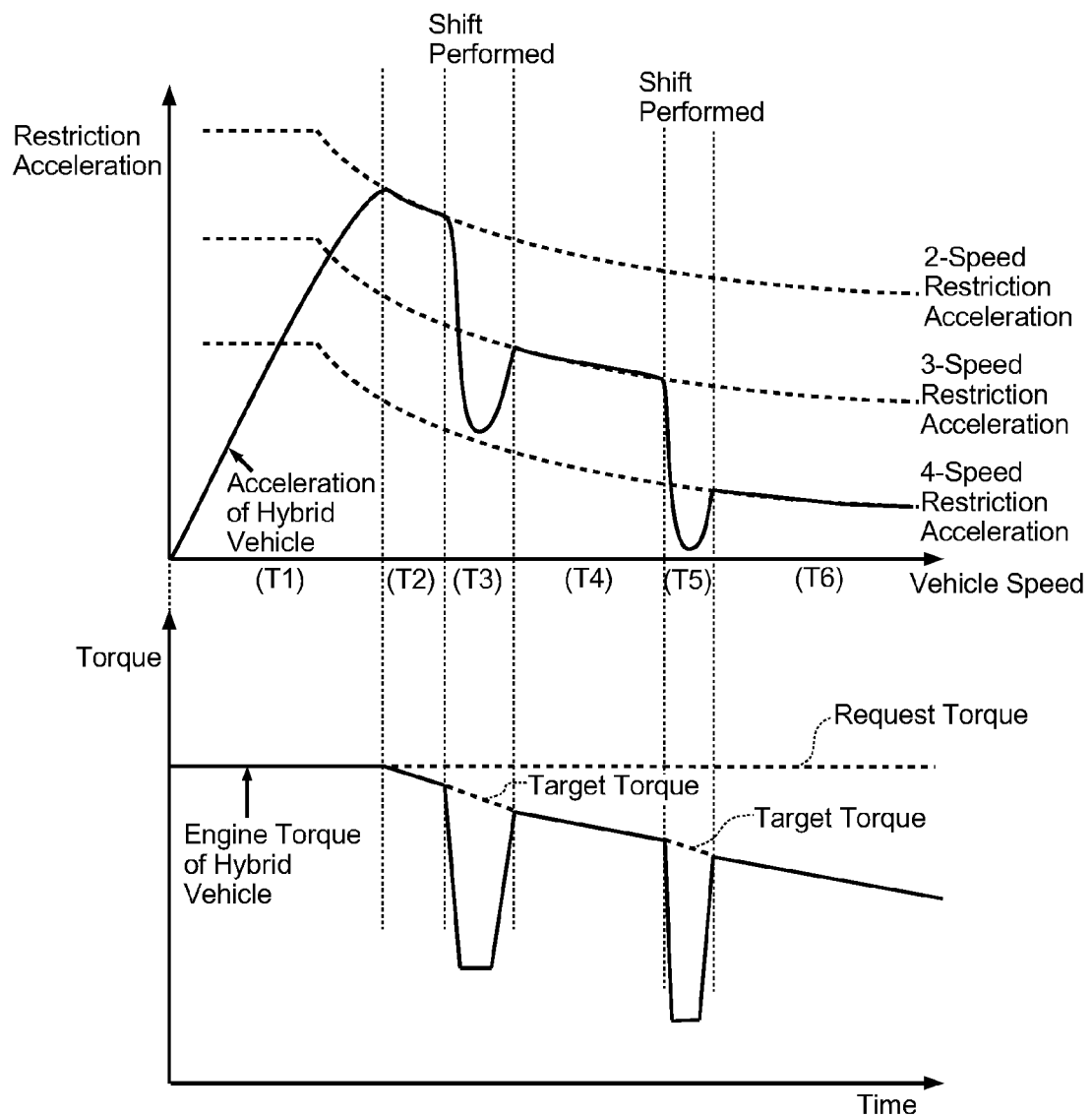
FIG. 3 is a diagram illustrating the relationship between a restriction acceleration and a gear stage, and a change in torque during transmission in an output restriction control of an output restriction control unit of FIG. 2.

As illustrated in the upper part of FIG. 3, the hybrid vehicle 1 is accelerated to second speed of a start stage (time period T1) and when the hybrid vehicle 1 reaches the second-speed restriction acceleration, the acceleration is suppressed to the restriction acceleration while the hybrid vehicle 1 reaches the second-speed restriction acceleration (time period T2). Herein, when the transmission is performed (time period T3), the gear stage goes to a neutral stage and the torque of the engine 10 is once lessened. When the transmission is completed, the torque of the engine 10 is restored and the hybrid vehicle 1 is accelerated up to the third-speed restriction acceleration.

When the hybrid vehicle 1 is continuously driven at the third-speed restriction acceleration and thus the vehicle speed is further increased (time period T4), the transmission is performed again (time period T5). Herein, when the transmission is performed (time period T5), the gear stage goes to the neutral stage and the torque of the engine 10 is once lessened. When the transmission is completed, the torque of the engine 10 is restored and the hybrid vehicle 1 is accelerated up to the fourth-speed restriction acceleration. Thereafter, the hybrid vehicle 1 is driven at the fourth-speed restriction acceleration (time period T6).

Next, referring to the flowchart of FIG. 4, the processing (processing 1) of an output restriction temporary release control during the output restriction, which is performed in the hybrid ECU 18 that executes the computer program, will be described. Note that a flow of FIG. 4 is processing for one cycle and as long as the key switch 20 is in an ON state, the processing is repeatedly executed.

Figure 4:
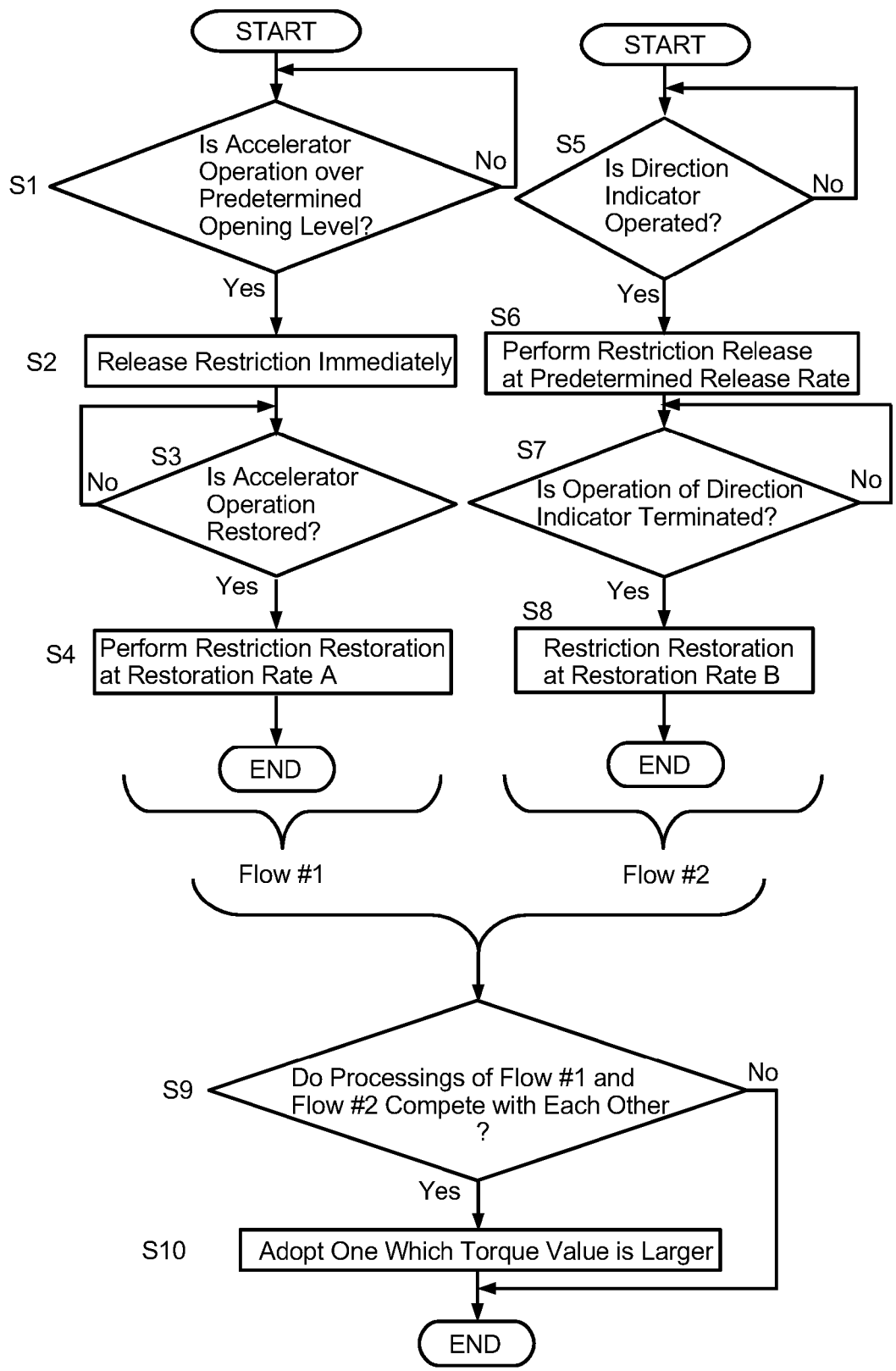
FIG. 4 is a flowchart illustrating processing (processing 1) of the output restriction control unit of FIG. 2.

In the flowchart of FIG. 4, processing (processing at an accelerator operating side) of flow #1 including a process of steps S1 to S4 and processing (processing at a direction indicator operating side) of flow #2 including a process of steps S5 to S8 are performed in parallel and thus will be individually described.

(Processing of flow #1)

In 'START' of FIG. 4, the key switch 21 is in the ON state, the hybrid ECU 18 executes the computer program, the output restriction control unit 30 is implemented in the hybrid ECU 18, and the process proceeds to step S1. Note that in 'START', the hybrid vehicle 1 is performing the output restriction.

In step S1, the output restriction control unit 30 determines whether an operation of the accelerator over a predetermined opening level is performed. When it is determined that the operation of the accelerator over the predetermined opening level is performed, the process proceeds to step S2. On the other hand, when it is determined that the operation of the accelerator over the predetermined opening level is not performed, the process repeats step S1.

In step S2, the output restriction control unit 30 immediately releases the output restriction. In this case, the output restriction release display unit 20 displays or outputs that the restriction is released. Immediately releasing the output restriction denotes releasing the output restriction without setting a rate at the time of releasing the output restriction. In this case, an object to be controlled, which has been subjected to the output restriction up to now, is subjected to a random release of the output restriction in accordance with each characteristic.

In step S3, the output restriction control unit 30 determines whether the operation of the accelerator is restored to a predetermined opening level or less (that is, the opening level of the accelerator is returned to the predetermined opening level or less). When it is determined that the operation of the accelerator is restored, the process proceeds to step S4.

In step S4, the output restriction control unit 30 performs the restriction restoration at a restoration rate A, and as a result, the processing for one cycle is terminated. Note that the restoration rate A will be described below. In this case, the display or the output of the output restriction release display unit 20 is stopped.

(Processing of flow #2)

A condition for 'START' is the same as that of flow #1 and the process proceeds to step S5.

In step S5, the output restriction control unit 30 determines whether a direction indicator is operated. In step S5, when it is determined that the direction indicator is operated, the process proceeds to step S6. On the other hand, in step S5, when it is determined that the direction indicator is not operated, the process repeats step S5.

In step S6, the output restriction control unit 30 performs the restriction release at a predetermined release rate, and as a result, the process proceeds to step S7. In this case, the output restriction release display unit 20 displays or outputs that the restriction is released. Note that the release rate will be described below.

In step S7, the output restriction control unit 30 determines whether the operation of the direction indicator is terminated. In step S7, when it is determined that the operation of the direction indicator is terminated, the process proceeds to step S8.

In step S8, the output restriction control unit 30 performs the restriction restoration at a restoration rate B, and as a result, the processing for one cycle is terminated. In this case, the display or the output of the output restriction release display unit 20 is stopped. Note that the restoration rate B will be described below.

(Regarding competition control of restriction release processing)

In the processings of flows #1 and #2 described above, processing when at least a part of the processings of flows #1 and #2 are performed in parallel (this is called processing competition) will be described below.

In step S9, the output restriction control unit 30 determines whether the restriction release processings of torque of flows #1 and #2 compete with each other. In step S9, when it is determined that the restriction release processings of torque of flows #1 and #2 compete with each other, the process proceeds to step S10. In step S9, when it is determined that the restriction release processings of torque of flows #1 and #2 do not compete with each other, the processing for one cycle is terminated.

In step S10, the output restriction control unit 30 adopts torque at a side where a torque value of a restriction release result is larger in the restriction release processings of torque of flows #1 and #2 and as a result, the processing for one cycle is terminated.

For example, when the hybrid vehicle 1 changes a course for overtaking, the direction indicator is operated and thereafter, the accelerator may be fully operated. In this case, in the processing of FIG. 4, since the processing (flow #2) at the direction indicator operating side has already been started, the processing (flow #1) at the accelerator operating side is thereafter performed. At this time, in the processing (flow #1) at the accelerator operating side, since torque is unexpectedly increased, the torque value of the result of the processing (flow #1) at the accelerator operating side, which is performed later, may be larger than the torque value of the result of the processing (flow #2) at the direction indicator operating side, which is early performed. In this case, the output restriction control unit 30 performs the output restriction by reflecting the torque value of the result of the processing (flow #1) at the accelerator operating side, which is performed later.

Next, referring to the flowchart of FIG. 5, the processing (processing 2) of the output restriction temporary release control during the output restriction, which is performed in the hybrid ECU 18 that executes the computer program, will be described. Note that a flow of FIG. 5 is processing for one cycle and as long as the key switch 20 is in the ON state, the processing is repeatedly executed.

Figure 5:
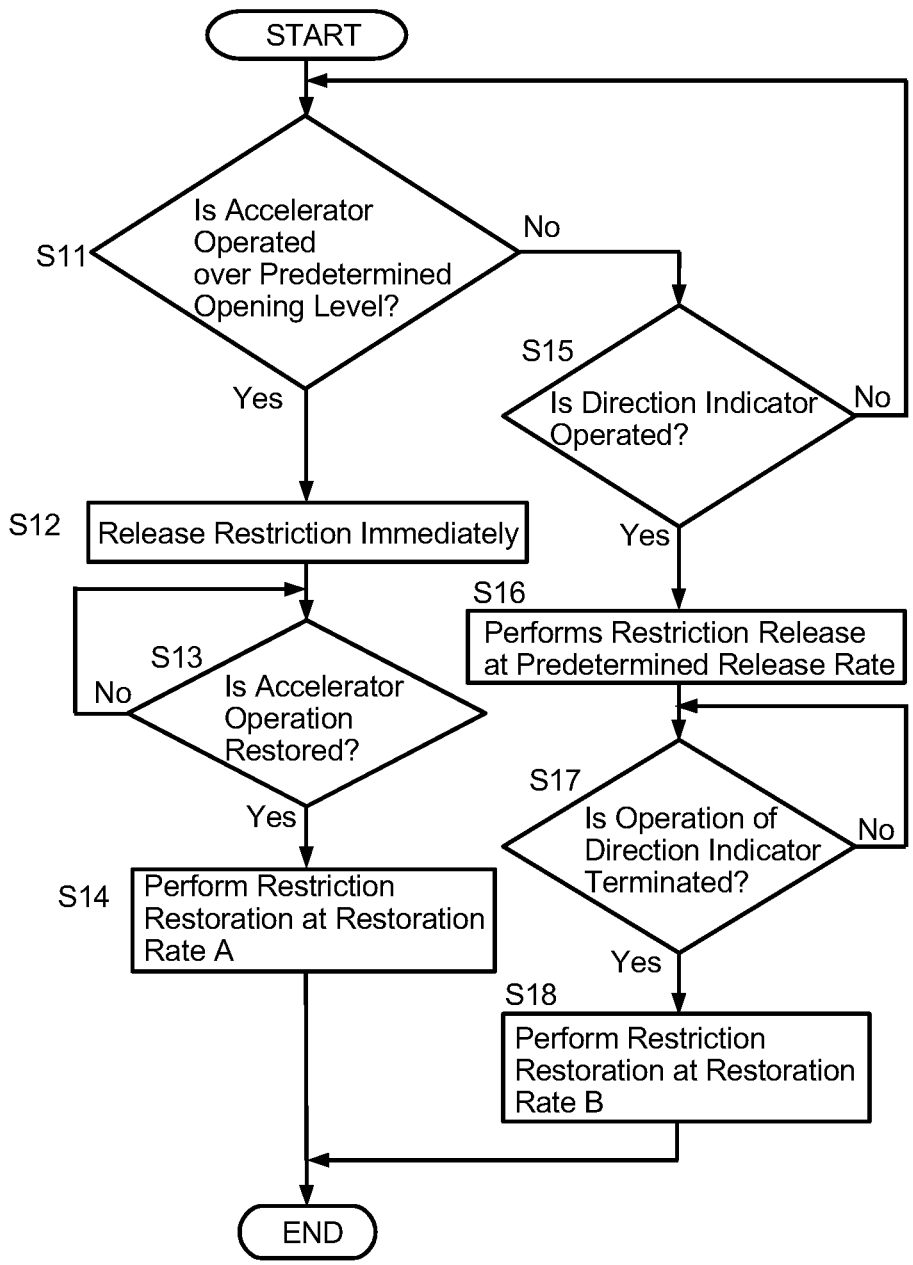
FIG. 5 is a flowchart illustrating processing (processing 2) of the output restriction control unit of FIG. 2.

In 'START' of FIG. 5, the key switch 21 is in the ON state, the hybrid ECU 18 executes the computer program, the output restriction control unit 30 is implemented in the hybrid ECU 18, and the process proceeds to step S11. Note that, in 'START', the hybrid vehicle 1 is performing the output restriction.

In step S11, the output restriction control unit 30 determines whether the operation of the accelerator over a predetermined opening level is performed. When it is determined that the operation of the accelerator over the predetermined opening level is performed, the process proceeds to step S12. On the other hand, when it is determined that the operation of the accelerator over the predetermined opening level is not performed, the process proceeds to step S15.

In step S12, the output restriction control unit 30 releases the output restriction. In this case, the output restriction release display unit 20 displays or outputs that the restriction is released.

In step S13, the output restriction control unit 30 determines whether the operation of the accelerator is restored to a predetermined opening level or less (that is, the opening level of the accelerator is returned to the predetermined opening level or less). When it is determined that the operation of the accelerator is restored, the process proceeds to step S14.

In step S14, the output restriction control unit 30 performs restriction restoration at a restoration rate A, and as a result, the processing for one cycle is terminated. Note that the restoration rate A will be described below. In this case, the display or the output of the output restriction release display unit 20 is stopped.

In step S15, the output restriction control unit 30 determines whether a direction indicator is operated. In step S15, when it is determined that the direction indicator is operated, the process proceeds to step S16. On the other hand, in step S5, when it is determined that the direction indicator is not operated, the process returns to step S11.

In step S16, the output restriction control unit 30 performs the restriction release at a predetermined release rate, and as a result, the process proceeds to step S17. In this case, the output restriction release display unit 20 displays or outputs that the restriction is released. Note that the release rate will be described below.

In step S17, the output restriction control unit 30 determines whether the operation of the direction indicator is terminated. In step S17, when it is determined that the operation of the direction indicator is terminated, the process proceeds to step S18.

In step S18, the output restriction control unit 30 performs the restriction restoration at a restoration rate B, and as a result, the processing for one cycle is terminated. In this case, the display or the output of the output restriction release display unit 20 is stopped. Further, the restoration rate B will be described below.

For example, when the hybrid vehicle 1 changes a course for overtaking, the direction indicator is operated and thereafter, the accelerator may be fully operated. In this case, in the processing of FIG. 5, processing (S15 □ S16 □ S17 □ S18) at the direction indicator operating side has already been started, but, processing (S11 □ S12 □ S13 □ S14) at the accelerator operating side is not performed. As such, in the processing of FIG. 5, when the processing at either one of the accelerator operating side and the direction indicator operating side is first started, the other processing is not performed. Note that, in the flowchart of FIG. 5, the positional relationships of steps S11 to S14 (the processing at the accelerator operating side) and steps S15 to S18 (the processing at the direction indicator operating side) may be exchanged.

Figure 6:
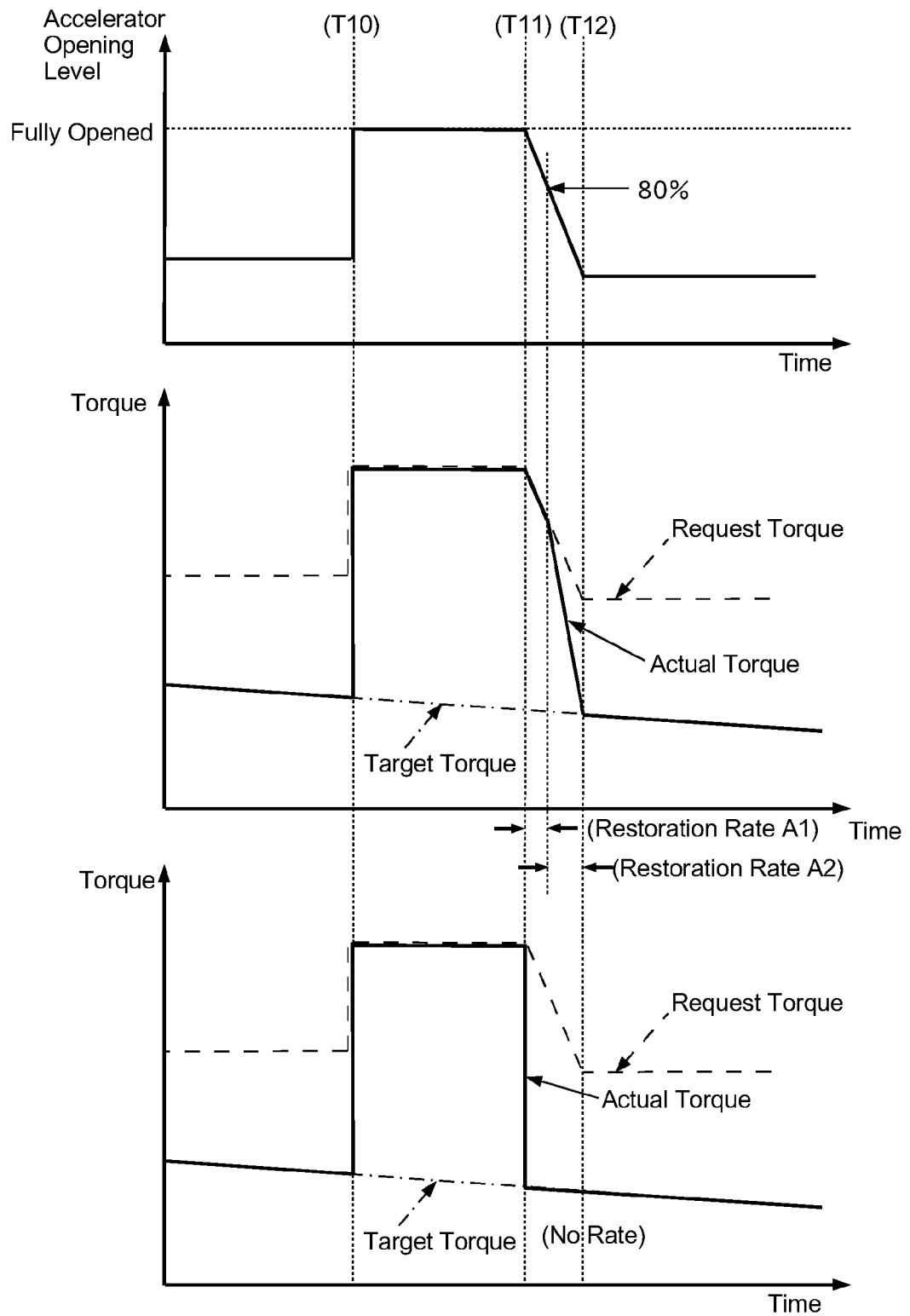
FIG. 6 is a diagram illustrating the relationship between an accelerator opening level and torque in the output restriction control of the output restriction control unit of FIG. 2.

Next, the relationship between the accelerator opening level and the torque in the output restriction control of the output restriction control unit 30 will be described with reference to FIG. 6. An upper part of FIG. 6 illustrates a change in the accelerator opening level with a time elapsed. A middle part of FIG. 6 illustrates a change in the torque when the output restriction control unit 30 performs the output restriction control with a time elapsed. A lower part of FIG. 6 illustrates a change in the torque in the conventional art with a time elapsed as a comparative example.

At a timing earlier than a timing T10 of FIG. 6, the accelerator opening level is within an ordinary range and the output restriction is being performed. At the timing T10, the accelerator is suddenly operated by the driver, and as a result, the accelerator opening level is full open. As a result, the output restriction control unit 30 releases the output restriction. Thereafter, until the accelerator opening level reaches, for example, approximately 80% after the driver starts releasing the accelerator pedal at a timing T11, the output restriction control unit 30 restores the output restriction so that actual torque is close to target torque at a restoration rate A1, as illustrated in the middle part of FIG. 6. When the driver releases the accelerator pedal, and thus the accelerator opening level is 80% or less, the output restriction control unit 30 restores the output restriction so that the actual torque is close to the target torque at a restoration rate A2, as illustrated in the middle part of FIG. 6. At a timing T12, the accelerator opening level is restored to the ordinary range and the output restriction is also restored.

In the comparative example illustrated in the lowermost part of FIG. 6, a rate in restoration of the output restriction between the timing T11 and the timing T12 is not set. Accordingly, in the comparative example, when the driver releases the accelerator pedal from a full-open state even a little, the output restriction is unexpectedly restored (the actual torque becomes the target torque), and thus the driver feels a quick brake.

Figure 7:
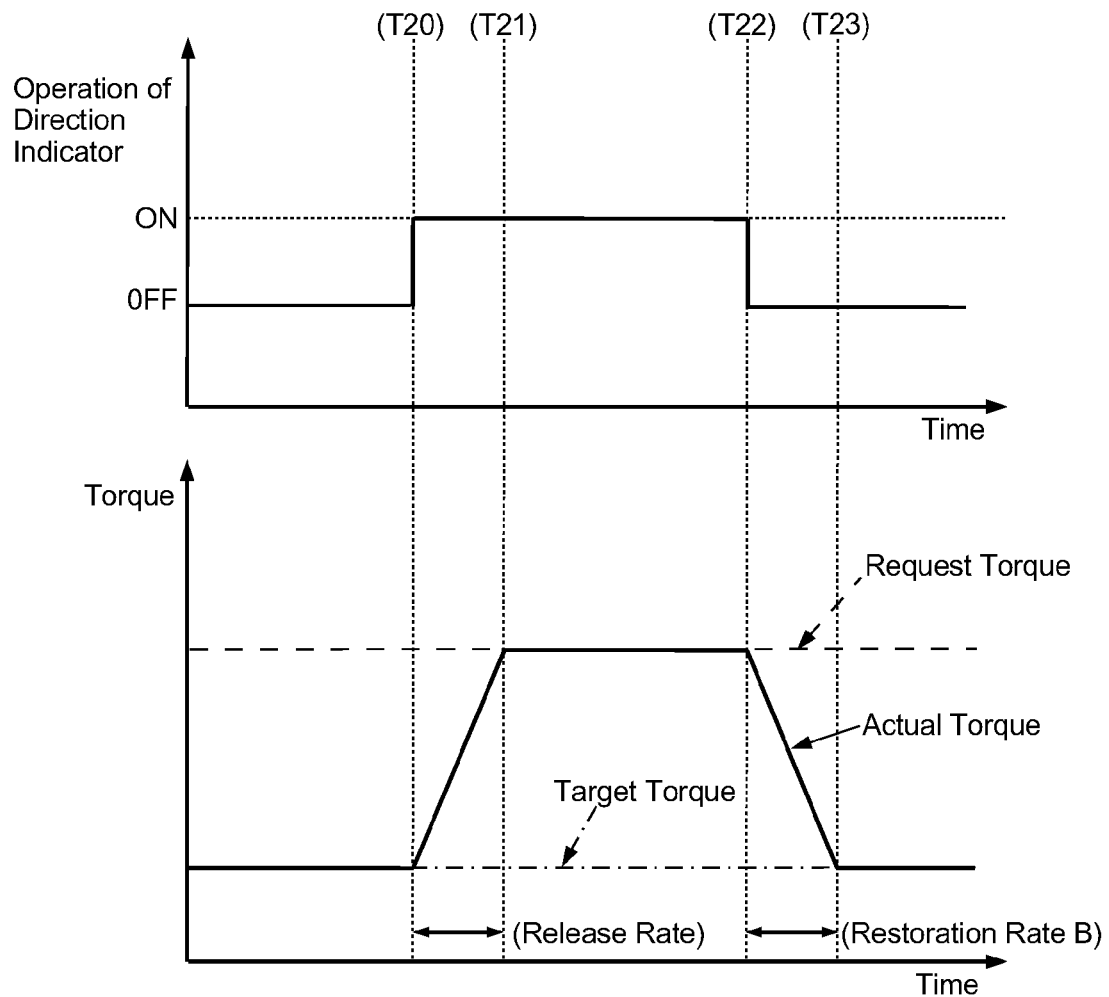
FIG. 7 is a diagram illustrating the relationship between an operation of a direction indicator and torque in the output restriction control of the output restriction control unit of FIG. 2.

Next, the relationship between the operation of the direction indicator and the torque in the output restriction control of the output restriction control unit 30 will be described with reference to FIG. 7. The relationship of FIG. 7 is the same as that of FIG. 6. An upper part of FIG. 7 illustrates the operation of the direction indicator with a time elapsed. A lower part of FIG. 7 illustrates a change in the torque when the output restriction control unit 30 performs the output restriction control with a time elapsed.

At a timing earlier than a timing T20 of FIG. 7, the direction indicator is not operated and the output restriction is being performed. At the timing T20, the direction indicator is operated by the driver. As a result, the output restriction control unit 30 temporarily releases the output restriction at a release rate. At a timing T21, the direction indicator is continuously operated, and as a result, the output restriction is being released and the actual torque approximately coincides with request torque. At a timing T22, the operation of the direction indicator is terminated. As a result, the output restriction control unit 30 restores the output restriction so that the actual torque is close to the target torque at the restoration rate B. Herein, the restoration rate B is, for example, the same as the release rate. At a timing T23, the output restriction is restored.

(In regard to effects)

In the hybrid vehicle 1, the output restriction control unit 30 immediately releases the output restriction with respect to a driver's sudden operation of an accelerator over a predetermined accelerator opening level and gently restores the output restriction based on a predetermined restoration rate in restoration from the sudden operation of an accelerator. That is, a situation in which the driver suddenly operates the accelerator represents a state in which the driver requests a large acceleration. Therefore, the output restriction is immediately released in order to meet a driver's request. On the other hand, when the driver's operation of an accelerator is restored to an ordinary state, the output restriction is restored at a predetermined rate. As a result, the output restriction may be restored without giving the driver a shock of the quick brake. Therefore, a driver's drivability may be improved while the output restriction is performed.

In regard to the driver's operation of a direction indicator, the output restriction is gently released based on a predetermined release rate and the output restriction is gently restored based on a predetermined restoration rate when the operation of the direction indicator is terminated. That is, a situation in which the driver operates the direction indicator precedes a course change or right and left-turn at a crossroad, and the like. Under this situation, since an agile movement of the hybrid vehicle 1 is required, the output restriction is temporarily released and the output restriction is controlled so as to satisfy the driver's request torque. However, in the case of the course change or the right and left-turn at the crossroad, and the like, the direction indicator is precedingly operated. Accordingly, the release of the output restriction in this case is performed at a predetermined rate to prevent the driver from feeling an unexpected change in drivability. When the operation of the direction indicator is terminated, the output restriction is restored and even in this case, the output restriction is restored at a predetermined rate to prevent the driver from feeling the unexpected change in drivability. Therefore, the driver's drivability may be improved while the output restriction is performed.

Note that, in the case of the course change or the right and left-turn at the crossroad, and the like, the operation of the direction indicator precedes the operation of the accelerator. Accordingly, actually, according to the processing (processing 1) described in FIG. 4, there are many cases that the torque is increased at the release rate illustrated in FIG. 7 by operating the direction indicator and the torque is further increased by operating the accelerator a little later, and continuously, the torque is restored at the restoration rates A1 and A2 by restoring the operation of the accelerator. In this case, the torque is slowly increased, and the torque is further increased, and thereafter, the torque is slowly restored. Therefore, drivability is excellent.

According to the processing (processing 2) described in FIG. 5, there are many cases that the torque is increased at the release rate illustrated in FIG. 7 by operating the direction indicator and the torque is restored at the restoration rates A1 and A2 by restoring the operation of the accelerator illustrated in FIG. 6. In this case also, since the torque is slowly increased and slowly restored, drivability is excellent.

The driver may recognize the release state of the output restriction by the display of the output restriction release display unit 20. Therefore, the driver may be conscious of low-fuel efficiency driving such as taking care of driving so as to prevent the output restriction from being released as much as possible.

(Other Embodiments)

The engine 10 has been described as the internal combustion engine, but may be a heat engine including an external-combustion engine.

Further, although it has been described that the computer program executed by the hybrid ECU 18 is installed in the hybrid ECU 18 in advance, removable media in which the computer program is recorded (which stores the computer program) may be mounted on a drive (not illustrated in the drawings), and the like, the computer program read from the removable media may be stored in the nonvolatile memory in the hybrid ECU 18, or a computer program transmitted through wired or wireless transmission media may be received by a communication unit (not illustrated in the drawings) and stored in the nonvolatile memory in the hybrid ECU 18 to be installed in the hybrid ECU 18 as the computer.

Further, each ECU may be implemented by an ECU acquired by integrating some or all of the functions as one or an ECU acquired by further segmenting the function of each ECU may be newly provided.

In addition, the computer program executed by the computer may be a computer program which is processed in time series according to the sequence described in the specification and a computer program which is processed in parallel, or at a required timing such as the time when calling is performed.

The embodiment of the present invention is not limited to the aforementioned embodiments and may be variously changed within a scope without departing from the gist of the present invention.

The invention claimed is:

1. An output restriction control device mounted on a hybrid vehicle having an engine and an electric motor, which is drivable by the engine or the electric motor or drivable by cooperation of the engine and the electric motor, the output restriction control device comprising:
   an electronic control unit (ECU) configured to perform functions of an output restriction control unit, which restricts torque output from the engine and/or the electric motor,
   wherein the output restriction control unit releases or restores an output restriction in accordance with a predetermined operation of a driver, and a predetermined release rate or a predetermined restoration rate is settable for release or restoration of the output restriction, respectively,
   wherein the predetermined operation is an operation of an accelerator and an operation of a direction indicator, and the output restriction control unit immediately releases the output restriction with respect to a driver's operation of an accelerator over a predetermined accelerator opening level, restores the output restriction based on a first predetermined restoration rate in restoration from the accelerator operation, releases the output restriction based on a predetermined release rate with respect to a driver's operation of a direction indicator, and restores the output restriction based on a second predetermined restoration rate when the operation of the direction indicator is terminated, and
   wherein the first and second predetermined restoration rates are different rates and the predetermined release rate is not an immediate release.

2. The output restriction control device according to claim 1, wherein, when at least some of a series of controls to restore from release of the output restriction caused by the operation of the accelerator and a series of controls to restore from release of the output restriction caused by the operation of the direction indicator are performed in parallel, a side in which a torque value of a control result is larger is adopted.

3. The output restriction control device according to claim 1, wherein, when either control of a series of controls to restore from release of the output restriction caused by the operation of the accelerator and a series of controls to restore from release of the output restriction caused by the operation of the direction indicator is performed, the other control is not performed.

4. The output restriction control device according to claim 1, further comprising:
   an output restriction release display unit displaying that the output restriction control unit releases the output restriction.

5. A hybrid vehicle having the output restriction control device according to claim 1.

6. An output restriction control method for an output restriction control device mounted on a hybrid vehicle having an engine and an electric motor, which is drivable by the engine or the electric motor or drivable by cooperation of the engine and the electric motor and having an output restriction control unit restricting torque output from the engine and/or the electric motor, comprising:
   an output restriction control step of releasing or restoring an output restriction in accordance with a predetermined operation of a driver, in which a predetermined release rate or a predetermined restoration rate is settable for release or restoration of the output restriction, respectively,
   wherein the predetermined operation is an operation of an accelerator and an operation of a direction indicator, and the output restriction control unit immediately releases the output restriction with respect to a driver's operation of an accelerator over a predetermined accelerator opening level, restores the output restriction based on a first predetermined restoration rate in restoration from the accelerator operation, releases the output restriction based on a second predetermined release rate with respect to a driver's operation of a direction indicator, and restores the output restriction based on a predetermined restoration rate when the operation of the direction indicator is terminated, and
   wherein the first and second predetermined restoration rates are different rates and the predetermined release rate is not an immediate release.

7. A non-transitory computer readable storage medium for storing a computer program for causing an information processing device to implement a function of the output restriction control device according to claim 1.

\* \* \* \* \*